US007164354B1

(12) United States Patent
Panzer

(10) Patent No.: US 7,164,354 B1
(45) Date of Patent: Jan. 16, 2007

(54) CHILD PROTECTION SYSTEM

(76) Inventor: Justin Panzer, 7347 Norris Ave., Sykesville, MD (US) 21784

( * ) Notice: Subject to any disclaimer, the term of this patent is extended or adjusted under 35 U.S.C. 154(b) by 193 days.

(21) Appl. No.: 11/042,502

(22) Filed: Jan. 25, 2005

(51) Int. Cl.
*G08B 1/00* (2006.01)
*H04Q 7/00* (2006.01)

(52) U.S. Cl. ........................... 340/539.15; 340/539.13; 340/572.1; 340/825.49; 235/384

(58) Field of Classification Search ........... 340/539.15, 340/539.13, 572.1
See application file for complete search history.

(56) References Cited

U.S. PATENT DOCUMENTS

| | | | | |
|---|---|---|---|---|
| 4,027,423 | A | 6/1977 | Barlow et al. | |
| 5,167,356 | A | 12/1992 | Williams | |
| 5,307,763 | A | 5/1994 | Arthur et al. | |
| 5,363,425 | A * | 11/1994 | Mufti et al. | 379/201.06 |
| 5,423,574 | A | 6/1995 | Forte-Pathroff | |
| 5,426,425 | A * | 6/1995 | Conrad et al. | 340/825.49 |
| 5,557,259 | A | 9/1996 | Musa | |
| 5,617,074 | A | 4/1997 | White | |
| 5,755,116 | A | 5/1998 | Sparacino et al. | |
| 5,858,262 | A | 1/1999 | Lebensfeld | |
| 5,936,530 | A | 8/1999 | Meinhold | |
| 5,938,153 | A | 8/1999 | Coleman et al. | |
| 5,952,927 | A | 9/1999 | Eshman et al. | |
| 5,978,493 | A | 11/1999 | Kravitz et al. | |
| 5,996,380 | A | 12/1999 | Harris | |
| 6,031,460 | A | 2/2000 | Banks | |
| 6,075,442 | A | 6/2000 | Welch | |
| 6,169,494 | B1 | 1/2001 | Lopes | |
| 6,242,264 | B1 | 6/2001 | Natan et al. | |
| 6,263,710 | B1 | 7/2001 | Harris | |
| 6,396,403 | B1 | 5/2002 | Haner | |
| 6,462,656 | B1 * | 10/2002 | Ulrich et al. | 340/539.1 |
| 6,472,989 | B1 | 10/2002 | Roy, Jr. | |
| 6,747,562 | B1 | 6/2004 | Giraldin et al. | |
| 2002/0014993 | A1 | 2/2002 | Turner et al. | |

* cited by examiner

*Primary Examiner*—Donnie L. Crosland
(74) *Attorney, Agent, or Firm*—Caesar, Rivise, Bernstein, Cohen & Pokotilow, Ltd.

(57) ABSTRACT

A child monitoring system is provided for facilities and areas where parents and children generally enter and exit together, but are likely to become separated while in the facility or area. Using devices on a child's person coupled with monitoring devices on exit and entry ways, parents may be alerted in the event that a child wanders off or is the subject of an abduction attempt. Upon crossing a monitoring point, an alarm is triggered to alert parents and public safety officials of an unauthorized exit attempt. Thus with this system, a monitored child can not leave a monitored location (e.g., store, museum, etc) alone nor without the child's parent or guardian.

19 Claims, 3 Drawing Sheets

CHILD PROTECTION SYSTEM

BACKGROUND OF THE INVENTION

1. Field of Invention

The present invention relates to surveillance systems, and more particularly, to a method and system for detecting in real time a child's passage from a secure area.

2. Description of Related Art

According to statistics from the FBI's National Crime Information Center (NCIC), nearly 850,000 people are reported missing each year. Approximately 90% of those missing persons are under the age of eighteen, representing a total of about 725,000 annual juvenile cases. While many of these cases are quickly resolved, many others are abductions that often result in violence. In order to guard against such abductions, an increasing number of child tracking and child monitoring solutions are being marketed to parents.

Electronic detection systems are well known and have been applied to diverse applications. Such systems often include an indicator tag attached to a child to be detected by detection devices positioned near passageways for detection of an unauthorized passage of the child.

Child tracking and child monitoring systems are needed at public facilities such as retail stores, libraries, museums, theme parks, coliseums, stadiums, shopping centers, daycare centers and zoos. Some of these facilities have a multitude of obstructions, such as long and high counters with intervening aisles, large displays, walls separating rooms and numerous floors. A child could easily become lost in such an environment, in particular, amidst a multitude of shoppers. There is also the possibility that the child may become the victim of a kidnapping or abduction. The fact that the child is missing may not be detected for a substantial period of time because the parent may be engrossed in the shopping activity or believe that the child is safe. Unfortunately, the child may quickly separate from the parent by virtue of wandering or abduction.

The child monitoring systems that have had the most success to date in the mass market typically rely on global positioning satellite (GPS) technology. Known GPS locator tags, for example on a watch or backpack, provide satellite tracking capabilities to the wearer of the article. For a monthly fee, parents are able to access a GPS service provider's telephone number or website to request a locate of their child. This need to interface with a specific cellular telephone network is a glaring weakness of the GPS systems. If a child is located in an area where a server's provider's network provides no coverage, information can not be relayed to the central service and can not be made available to parents. In other words, areas without good network coverage create holes where tracking may not be successful. Another weakness with GPS centric systems is the potential difficulty to perform a locate indoors. Distributors of the GPS products indicate that the product is primarily intended for outdoor use.

Radio frequency identification (RFID) is surging in popularity as more and more uses for the technology are found. In early implementations, the technology was generally used for asset tracking in the shipping, manufacturing, retail and livestock industries. As wireless technologies infiltrate many segments of our society and prices of associated infrastructure decrease, it is more practical to look at RFID for other applications.

A basic RFID system consists of three components; an antenna or coil, a transceiver (with decoder), and a transponder (e.g., RF tag) electronically programmed with unique information. In a basic RFID system, the antenna emits radio signals to activate the tag and to read and write data to it. Antennas are the conduits between the tag and the transceiver, which controls the system's data acquisition and communication. Antennas can be placed at an entry/exit, for example, into or adjacent a door frame, to receive tag data from persons passing through the door. The electromagnetic field produced by an antenna can be constantly present, even when multiple tags are continually expected to pass. If constant interrogation is not required, the field can be activated as needed by a sensor device.

Often the antenna is packaged with the transceiver and decoder to become a reader (e.g., interrogator), which can be configured either as a hand-held or fixed mound device. The reader emits radio waves in ranges of from about one inch to over 100 feet, depending upon its power output and the radio frequency used. When an RFID tag passes through the electromagnetic zone of the reader, it detects the reader's activation signal. The reader decodes the tags data and the data is passed to a host computer for processing.

RFID tags are categorized as either active or passive. Active RFID tags are independently powered, generally by an internal battery, and are typically read/write devices (e.g., tag data can be rewritten and/or modified). An active tag's memory size varies to application requirements. In a typical read/write RFID system, a tag might give a machine a set of instructions, and the machine would then report its performance to the tag. This encoded data would then become part of the tagged part's history. The battery-supplied power of an active tag generally gives it a longer read range than a passive RFID tag, with the trade off of greater size, cost and a limited operational life.

Passive RFID tags operate without an internal power source and obtain operating power from the reader. Passive tags are consequently much lighter than active tags, less expensive, and offer a virtually unlimited operational lifetime period. The trade off is that passive RFID tags have shorter read ranges than active tags and require a higher powered reader. Read-only tags are typically passive and programmed with a unique set of data that can not be modified. Read-only tags typically operate as a license plate into a data base, in the same way linear bar codes reference a data base containing modifiable product-specific information.

RFID systems are also distinguished by their frequency ranges. Low-frequency systems (e.g., about 30 KHz to about 500 KHz) have shorter reading ranges and lower system costs. They are most commonly used in security access, asset tracking, and animal identification applications. High-frequency systems (e.g., about 850 MHz to about 950 MHz and about 2.4 GHz to about 2.5 GHz) offer reading ranges greater than about 90 feet and high reading speeds. Such systems are used for such applications as railroad car tracking and automated tow collection. However, the high performance of high-frequency RFID systems incurs higher system cost.

A significant advantage of RFID systems is the non-contact, non-line-of-sight nature of the technology. Packs can be read in visually and environmentally challenging conditions. RFID tags can also be read at remarkable speeds, in many cases responding in less than 100 milliseconds. For these reasons, RFID has become indispensable for a wide range of automated data collection and identification applications that would not be possible otherwise.

Another technology, known as Bluetooth Systems, is a short range wireless technology that originally was designed to replace infrared in mobile applications. Bluetooth technology can be used to allow multiple devices to interact with each other within a maximum range of 10 to 50 meters. Child tracking systems are used in the European market for amusement parks, shopping centers and zoos using Bluetooth readers and tags. However, there are key drawbacks of this technology. The limited range of the Bluetooth readers creates a need for more infrastructure than an RFID system, which translates into higher installation costs. Also, the Bluetooth technology does not provide a proactive solution for alerting parents to the location of a child. Parents must use their cellular telephone to initiate a short messaging service (SMS) to the Bluetooth system server in order to retrieve information. This requires cellular telephone service to be sufficient in the area from which the SMS is sent.

Another type of tracking system appears to have only the ability to track tags at an assigned location. It would be beneficial to track children using the same bracelet or wristband at any location where a system is installed to save money and make the use of the tags affordable.

BRIEF SUMMARY OF THE INVENTION

The present invention provides amore reliable child monitoring solution focusing on facilities and areas where parents and children generally enter and exit together, but are likely to become separated while in the facility or area. Using devices on a child's person coupled with monitoring devices on exit and entry ways, parents may be alerted in the event that a child wanders off or is the subject of an abduction attempt. Upon crossing a monitoring point, an alarm is triggered to alert parents and public safety officials of an unauthorized exit attempt. Thus with this system, a monitored child can not leave a monitored location (e.g., store, museum, etc) alone nor without the child's parent or guardian.

According to the preferred embodiments, RFID tags are preferably attached to a device and form a registerable monitoring unit (e.g., bracelet, anklet, necklace, wrist strap, clip-on) that requires a parent-child matching procedure to be deregistered or deactivated. Parents can purchase the monitoring units or rent them at a location equipped with the child monitoring system, such as retail stores, a shopping mall or a sports venue. In order to ensure that a monitored child, or other person desired to be monitored, leaves the monitored area with the appropriate person, a matching system is provided between the appropriate person (e.g., parent, guardian) and the monitored child that does not allow the child to leave the confines of the monitored area without the appropriate person. Upon entry in a monitor location, the child's RFID tag device is registered at a local kiosk terminal to the local system to identify the child and the child's parent/guardian as being present in the building. Before exiting, the parent and child will deregister or deactivate the device at a local exit kiosk terminal in order to avoid setting off associated alarms.

A preferred child monitoring method includes registering a RFID tag device, matching the registered RFID tag device to a child and to a guardian of the child, with both the child and the guardian being located within a predetermined area and only the child wearing the registered RFID tag device, associating a security code to the registered RFID tag device, continuously monitoring entry and exit ways of the predetermined area for the registered RFID tag device, detecting the registered RFID tag device near one of the monitored entry and exit ways, sending an alarm, identifying the child and the guardian matching the registered RFID tag device, and deregistering the registered RFID tag device upon receipt of the associated security code.

In another embodiment, the registration and deregistration process are automatic and a kiosk terminal is not required. In this embodiment, the parent or guardian wears an RFID tag associated with the RFID tag of the child. As both tags pass through an entry or exit way, an RFID reader identifies both tags as corresponding with each other and automatically registers the tags upon entry or deregisters the tags upon exit if the tags, or persons wearing the tags pass through the entry or exit way within a predetermined time period (e.g., 1 to 10 seconds). Using this preferred embodiment, the system sets the alarm if a registered tag passes through an exit or entry way without its associated tag.

The preferred system allows a user to have one bracelet or wristband that works at any location where a system is installed. The ability to query back and forth between locations and a central server provides this flexibility.

Further scope of applicability of the present invention will become apparent from the detailed description given hereinafter. However, it should be understood that the detailed description and specific examples, while indicating preferred embodiments of the invention, are given by way of illustration only, and that the invention is not limited to the precise arrangements and instrumentalities shown, since the invention will become apparent to those skilled in the art from this detailed description.

DETAILED DESCRIPTION OF THE INVENTION

Figure 1:
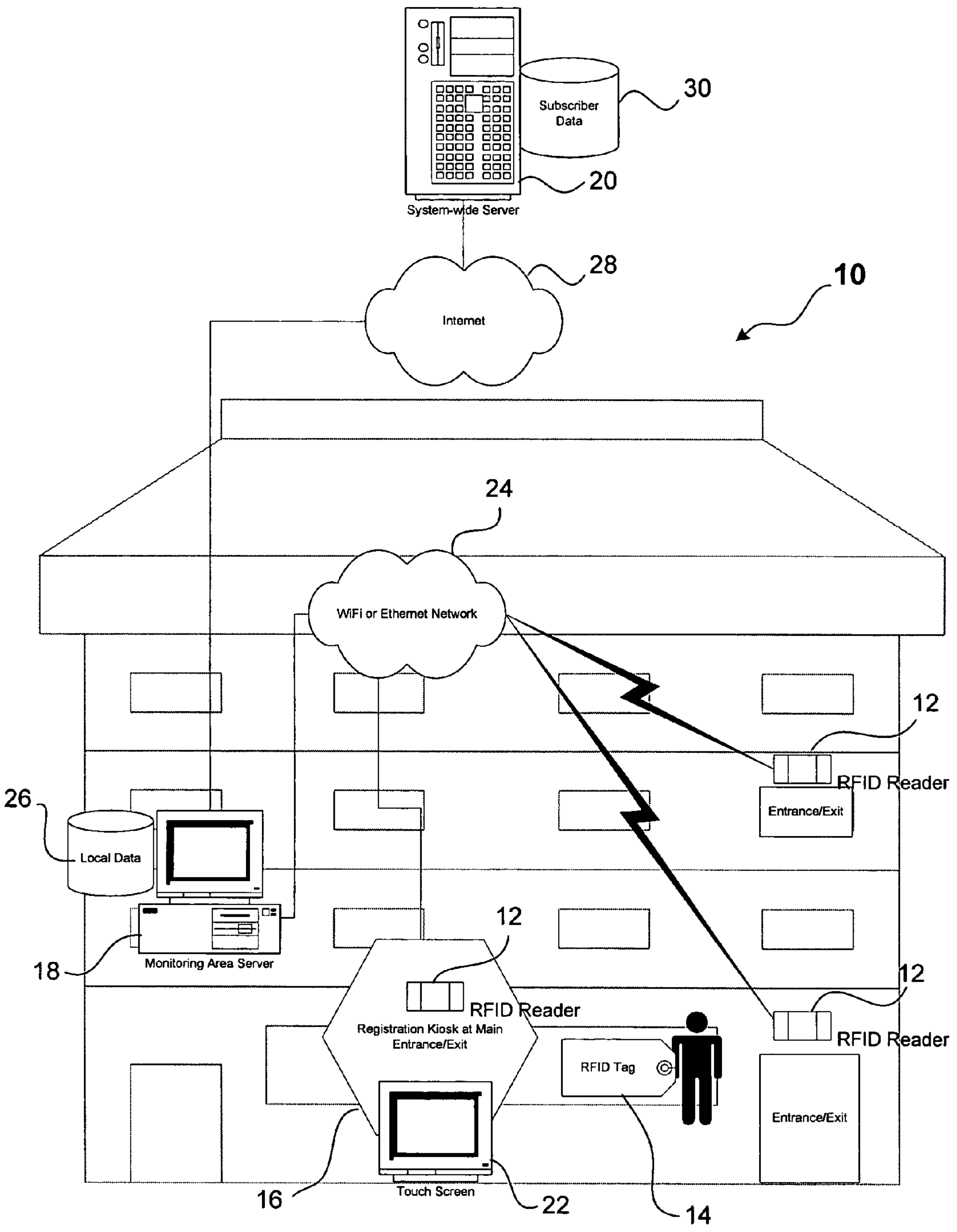
FIG. 1 is an illustration of a child protection system in accordance with a preferred embodiment of the invention.

In a preferred embodiment, a monitoring unit including a small passive RFID tag is placed on the person of a child. RFID readers are located near doors, windows, entry/exit ways or other desired locations to define a monitored area. The tag is registered to the child and a guardian using a matching system. If the tag enters a designated range of a reader, an alarm sounds and a central server indicates the tag that is associated with the violation. This tag is associated with personal information about the child wearing the tag and their guardian so that the system can access the database and determine who has crossed the monitored boundary and access and/or provide contact information for the guardian.

The monitoring unit can be placed, for example, on the child's wrist, neck or ankle, and preferable is only removed by use of a key or code. This monitoring unit can be registered to a database in a home, a retail facility (e.g., Wal-mart, K-mart, Target, etc.) or other location to monitor the movement of the child within selected monitored boundaries. While not being limited to a particular theory, the boundaries are monitored by RFID sensors or interrogators located on or near doors, windows, fences, pools, or exit/entry ways, with notification being made to the parent/guardian if the child crosses a boundary. The notification is provided in the form of an alarm or other sensory stimulant recognizable by the parent, guardian or security personnel as indicia of an unauthorized crossing.

Preferably, the registration process can be conducted via a registration device (e.g., a kiosk terminal) or with the help of a consultant at one of the security system locations. The kiosk terminal preferably includes a registration device (e.g., kiosk, touch screen) and RFID interrogator (e.g., RFID reader) for easy registration. Part of the registration includes assigning a security code (e.g., PIN code, password) to the child's RFID tag device that is required for deregistration of the device, ensuring that the child is leaving with the right person. The registration process, security code, and RFID tag are included in the matching system between the parent/guardian and the child that does not permit the child to leave the confines of the monitored area without the parent or guardian.

In addition to the RFID tag devices and kiosk terminals, the preferred child protection system includes interrogators/readers, a computer server, a database and software that manage the system. The child protection system may also include a local or wide area network, and additional servers, computers, databases and software as needed to implement the system in one location or multiple locations, as is readily understood by a skilled artisan. Accordingly this system could be implemented as a network of single systems in various locations, with each location compatible with the RFID tag devices to prevent unwanted exit of a monitored child or monitoring unit bearer from a monitor location. This provides the advantage that a parent/guardian can monitor the child in different stores with the same monitoring unit, preferably by registering and deregistering the RFID monitoring unit at each location. In this manner the parent or guardian saves money by purchasing or renting only one monitoring unit that is compatible with multiple locations instead of acquiring a unit for each location.

In addition to keeping track of each monitored child in a monitored area, the database could be used to shorten the time needed to register the child. For example, the matching system could be set up to register a previously registered child that is wearing the RFID tag device simply by reading the tag and, if desired, accepting authorization to monitor the child. Other personal information typically entered at the kiosk terminal (e.g., security code, name of child, name of parent/guardian, contact data) would already be stored in the database if the child, via the RFID tag device, was previously registered and typically the information would not need to be reentered. As an alternative, the screen at the kiosk terminal could automatically display the previously entered information stored by the database to the parent or guardian upon interrogation of the matched tag and request confirmation before reregistering the child. Of course, it is preferred that the security code is not displayed. Instead the matching system could request that the security code be entered, reentered or validated as desired.

As an example of the preferred embodiment, FIG. 1 shows an overview of the child protection system 10, including databases and network connections between components of the system. As can be seen in FIG. 1, the child protection system 10 includes RFID readers 12 for monitoring RFID tags 14 registered to a person (e.g., a child) in a monitored area or facility (e.g., one or more stores). While not being limited to a particular theory, the child protection system also preferably includes a registration kiosk 16, a local server 18 and a system-wide server 20.

The RFID readers 12 are installed preferably at all entrance and exit locations of a monitored facility. If desired, RFID readers 12 may also be installed at transfer locations (e.g., between departments, limited personnel authorization zones, windows) within the facility that a child may unexpectedly pass through. The RFID tag 14 is sufficiently small and thin, as understood by a skilled artisan, to fit within a bracelet. The bracelet is preferably made of plastic and includes a locking mechanism, for example, a locking mechanism similar to those used with bracelet or anklets commonly attached to persons under house arrest or confinement. The preferred tag is attached to a monitored individual via the bracelet, in part because bracelets are often visible and may be difficult for a child to remove unassisted.

The kiosk 16 is a registration device preferably located near a main entrance or exit of the monitoring facility. As can be seen in FIG. 1, the kiosk 16 includes a touch screen 22 for data entry, and a RFID reader 12 for automated data capture via interrogation of a RFID tag 14. The touch screen 22 is a communication device that could also be used to communicate registration data manually from a user in lieu of or in addition to the automated data capture of the kiosk RFID reader 12. While not being limited to a particular theory, the kiosk 16 is communicatively connected to the local server 18 via a wired or wireless Ethernet 24.

Still referring to FIG. 1, the kiosk 16 request information from the user, including a bracelet identification (e.g., RFID tag identification) that may be obtained by manual entry at the touch screen 22 and/or by the RFID reader 12 at the kiosk 16. The registration and de-registration processes require a PIN code. The PIN code is set by the user during registration when the user initializes the RFID tag 14. Initialization requires basic guardian and child information, preferably including but not limited to name, address, phone number, email address, etc. During the initialization process at registration, the kiosk 16 may also request a backup security question and answer of the type similar to what credit card companies or websites require in case of a lost PIN. Some exemplary questions include mother's maiden name, place of birth, name of pet, etc. Although not required, the kiosk 16 may provide a confirmation of the registration or de-registration at the specific facility. The confirmation would include a timestamp and location or name of the monitored area or facility. While not being limited to a particular theory, the confirmation would preferably be printable, but could be presented in alternative forms, such as beamed to the user's PDA.

The local server 18 includes a local database 26 that stores information about the RFID readers 12 and locally registered users, including associated RFID tag identification numbers, user information and PIN codes, at the monitored facility. As noted in part above, the local server 18 communicates with the kiosk 16 and RFID readers via wired or wireless Ethernet. The local server 18 is communicatively coupled to the system-wide server 20 via a wide-area-network (WAN) or Internet 28.

The system-wide server 20 includes a subscriber database 30 that stores information about all facilities that use the child protection system 10, including user information and current registrations. While not being limited to a particular theory, the system-wide server 20 communicates with each monitored location and facility server 18 and local database 26 via the WAN/Internet 28.

Every location (e.g., local server 18 at a facility) knows the detail (e.g., location) of the readers 14 and entry/exit points. Its local database 26 stores information of everyone that is currently registered at that site and their associated activity. The activity information is held locally for some period of time (e.g., three months) before being archived at the subscriber database 30. All of the available bracelets—both initialized and not yet initialized, would be known in the subscriber database 30. All user information would also be stored in the subscriber database 30 and queries from the local servers 18 would be sent to the subscriber database as needed for relevant bracelet and user information.

Figure 2:
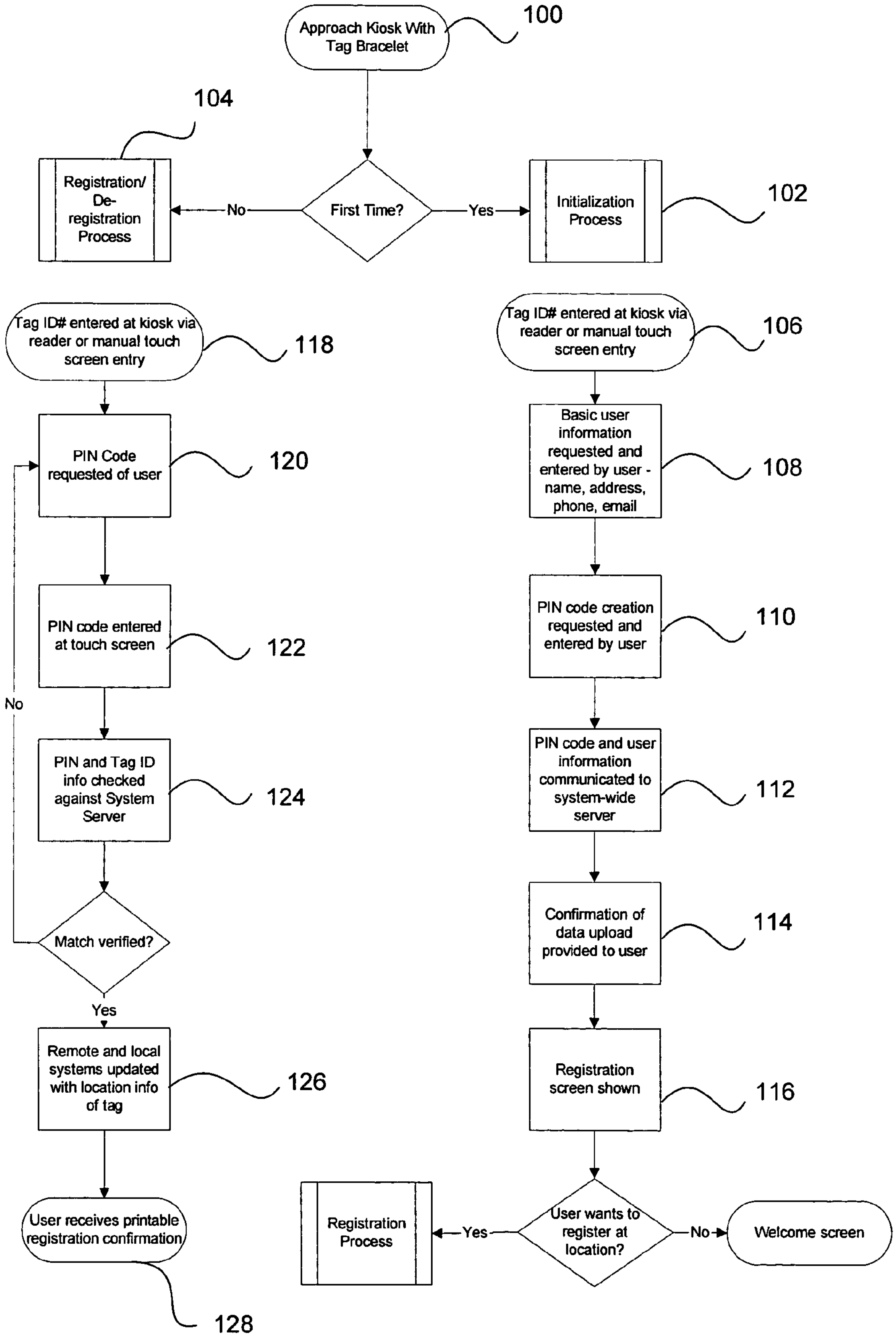
FIG. 2 is a flowchart of an exemplary registration/deregistration process system in accordance with a preferred embodiment of the invention.

FIG. 2 illustrates an exemplary flowchart of the registration/de-registration process, including interaction between a user and the child protection system 10 at the kiosk 16 of a monitored facility. At Step 100, a user (e.g., guardian, parent) approaches the kiosk 16 with a RFID tag bracelet adapted to fit an accompanying child. If it is the user's first time at the kiosk 16, then the child protection system 10 executes an initialization process at Step 102; otherwise, the system executes a registration/de-registration process at Step 104.

Regarding the initialization process 102, at Step 106, the user is prompted for and enters the identification number of the RFID tag 14 in the bracelet at the kiosk 16 via a RFID reader 12 or via a manual touch screen entry. Basic user information is requested and entered via the touch screen 22 at Step 108. While not being limited to a particular theory, the kiosk 16 request and accepts the user's name, address, phone number and email address, and forwards the user information to the local server 18 via the Ethernet 24 for storage in the local database 26. At Step 110, the child protection system 10 requests the PIN code, which is entered by the user and forwarded to the local server 18. This PIN code and user information is also communicated to the system-wide server 20, at Step 112, for storage in the subscriber database 30. At Step 114, confirmation of the data upload is provided to the user, and the touch screen 22 illustrates a registration screen at Step 116. If the user wants to register, and have a child monitored at that location and time, then the user begins the registration process at Step 104, otherwise the touch screen 22 defaults to a welcome screen.

Regarding the registration/de-registration process, at Step 118, the user is prompted for and enters the identification number of the RFID tag 14 in the bracelet at the kiosk 16 via a RFID reader 12 or via a manual touch screen entry. At Step 120, the child protection system 10 request the user's PIN code; this is entered at the touch screen 22, at Step 122. It should be noted that Steps 118 through 122 may be skipped for a user that is using the kiosk 16 for the first time, and has just completed the initialization process 102. Continuing with the process, at Step 124 the PIN code and RFID tag identification are checked against the user's PIN code and RFID tag identification that were previously entered by the user during the initialization process or subsequently revised. This previous information is stored at the system-wide server 20.

If the PIN code and RFID tag identification entered at Steps 122 and 118, respectively, do not match the user's stored PIN code and RFID tag identification, then the process loops back to Step 120 where the child protection system 10 again request the user's PIN code. It should be noted that if RFID tag identification entered at Step 118 does not match the user's stored RFID tag identification (ID), then the process could also loop back to Step 118 for re-entry of the tag ID. While it is not shown in FIG. 2, if the entered and re-entered PIN code and RFID tag ID fail to match the user's stored PIN code and RFID tag identification a predetermined number of times (e.g., three), then the process may loop back to the initialization process 102 and reinitialize the user and tag.

If the PIN code and RFID tag identification, entered at Steps 122 and 118, match the user's stored PIN code and RFID tag identification, then, at Step 126, the child protection system 10 updates the remote and local servers with the location information of the RFID tag 14. At Step 128, the child protection system 10 prints or beams a registration confirmation to the user, which also ends the registration process 104.

Figure 3:
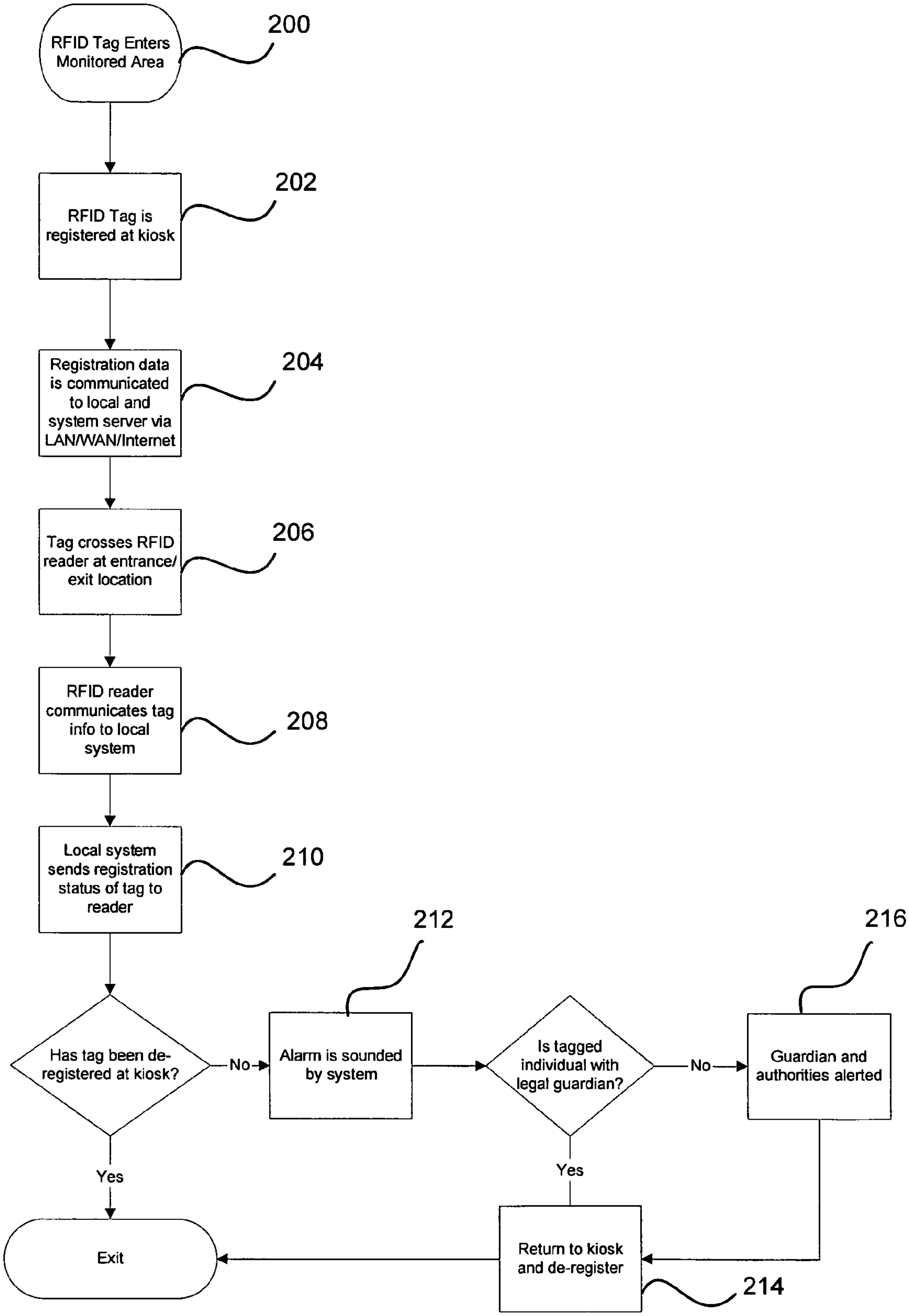
FIG. 3 is a flowchart describing a method of using the child protection system in accordance with a preferred embodiment of the invention.

FIG. 3 illustrates an exemplary flowchart, in accordance with a preferred embodiment of the child protection system 10, showing the operation of the system. At Step 200 an RFID tag 14 adapted to be carried on a child enters a monitored facility. The RFID tag 14 is registered at a kiosk 16, and initialized if needed, at Step 202. The registration indicates to the local server 18 and the system-wide server 20 that the tag 14 is in the perimeter entry/exit area and must not exit without being deregistered. At Step 204, registration data is communicated to the local server 18 and the system-wide server 20. As part of this step, the system-wide server 20 is queried to determine if the tag ID and the PIN code entered by the user match the information gathered during the initialization of the RFID tag 14. Steps 202 and 204 are described in greater detail above with respect to the flowchart illustrated in FIG. 2.

Still referring to FIG. 3, after the registration the tag is monitored within the monitoring area of the facility. At some time, designated as Step 206, the tag 14 crosses a RFID reader 12 at one of the entry or exit locations. At Step 208, the reader 12 identifies the tag 14 and communicates the tag ID to the local server 18. As noted above, all readers 12 maintain a data connection with the local server 18, preferably via wired or wireless Ethernet. The local server 18 retrieves the registration/de-registration status and forwards the status as needed to the reader 12 that located the tag, at Step 210. The registration status is important for determining if the person wearing the tag is authorized to leave the facility. In addition, it is possible that the child protection system 10 will locate a tag on the premises that was not registered because nobody wanted to have the tag and the person carrying the tag monitored at that time.

The system 10, and most preferably the local server 18 determines if the RFID tag 14 has been de-registered. If the tag 14 has been de-registered, most likely at a kiosk 16, then the system's monitoring of the tag is ended and no alarm is sounded. However, if the tag 14 has not been de-registered, then the tag is active and, at Step 212, the child protective system 10 sounds an alarm, focusing on the entry/exit location of the tagged individual carrying the active tag. If the tagged individual (e.g., child) is with its legal guardian, then the individual and guardian must return to a kiosk 16 and de-register the tag 14 at Step 214. If the tagged individual is not with its legal guardian, then at Step 216, the guardian and proper authorities are alerted to the unauthorized exit attempt by the individual, and the individual is kept by the authorities until the guardian arrives.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. Without further elaboration the foregoing will so fully illustrate my invention that others may, by applying current or future knowledge, readily adapt the same for use under various conditions of service.

What is claimed is:

1. A child protection system for use in a facility in conjunction with monitoring units that are placed on a person, the monitoring units having a radio frequency tag attached thereto, each tag including an antenna for use in detecting the presence of the monitoring unit by receiving an interrogation signal and returning a response signal, and an integrated circuit connected to the antenna for storing a tag identification and for outputting the tag identification with the response signal upon interrogation of the tag in the facility, the child protection system preventing the person from leaving the facility alone or without a designated escort and comprising:

a registration device for registering and de-registering the monitoring unit with the tag identification, user information and security codes near an entrance or exit of the facility;

a first radio frequency reader for monitoring a zone in the facility for disturbances in the form of a response signal caused by the presence of the radio frequency tag within the zone, said first radio frequency reader outputting an interrogator output signal upon detection of the radio frequency tag in the zone via the response signal, the interrogator output signal including the tag identification stored in the integrated circuit;

a local server communicatively coupled to the registration device and the first radio frequency device, said local server including a local database that stores information about the first radio frequency reader, the tag identification, the user information and the security codes, at the facility;

a system-wide server communicatively coupled to said local server, said system-wide server including a subscriber database that stores information about the facility and other such facilities that use the child protection system including user information and current registrations; and an alarm triggered upon the detection of the radio frequency tag of a registered monitoring unit in the zone to prevent the person from leaving the facility alone or without the designated escort.

2. The child monitoring system of claim 1, wherein said registration device includes a communication device for entry of the user information and the security codes from the escort.

3. The child monitoring system of claim 2, wherein said registration device further includes a second radio frequency reader that monitors a second zone adjacent said communication device for disturbances in the form of a response signal caused by the presence of the radio frequency tag within the second zone, said second radio frequency reader outputting an interrogator output signal to said local server upon detection of the radio frequency tag in the second zone via the response signal, the interrogator output signal including the tag identification stored in the integrated circuit.

4. The child monitoring system of claim 2, wherein said communication device is a kiosk.

5. The child monitoring system of claim 1, wherein the tag identification includes tag information of an escort tag associated with the radio frequency tag.

6. A method for preventing a person carrying a monitoring unit from secretly leaving a first facility without a predetermined escort of the person, comprising:

registering the monitoring unit;

matching the registered monitoring unit to the person and to the predetermined escort, with both the person and the escort being located within the first facility and the person wearing the registered monitoring unit;

associating a security code to the registered monitoring unit;

continuously monitoring entry and exit ways of the first facility for the registered monitoring unit;

detecting the registered monitoring unit near one of the monitored entry and exit ways;

sending an alarm to prevent the person from leaving the first facility;

identifying the person and the escort matching the registered monitoring unit; and deregistering the registered monitoring unit upon receipt of the associated security code as authorization to allow the person to leave the first facility with the escort without setting the alarm.

7. The method of claim 6, wherein the steps of registering the monitoring unit and deregistering the registered monitoring unit are provided at the first facility.

8. The method of claim 6, further comprising monitoring a matching monitoring unit associated with the monitoring unit carried on the person, the matching monitoring unit being carried by the escort and including the associated security code.

9. The method of claim 8, further comprising registering the matching monitoring unit at the first facility.

10. The method of claim 6, further comprising communicating information associated with the registered monitoring unit between the first facility and a central server, and registering the monitoring unit at a second facility based on the associated information.

11. The method of claim 6, before the step of registering the monitoring unit, further comprising initializing the monitoring unit, including opening a record for the person, entering information relating to the person and the predetermined escort, entering an identification of the monitoring unit, and entering a security code into the record.

12. The method of claim 11, wherein the step of matching the monitoring unit includes matching the information, identification and security code entered during the step of initializing the monitoring unit to the person and the predetermined escort registering the monitoring unit.

13. A system for preventing a person carrying a monitoring unit from secretly leaving a first facility without a predetermined escort of the person, comprising:

means for registering the monitoring unit;

means for matching the registered monitoring unit to the person and to the predetermined escort, with both the person and the escort being located within the first facility and the person wearing the registered monitoring unit;

means for associating a security code to the registered monitoring unit;

means for continuously monitoring entry and exit ways of the first facility for the registered monitoring unit;

means for detecting the registered monitoring unit near one of the monitored entry and exit ways;

means for sending an alarm to prevent the person from leaving the first facility;

means for identifying the person and the escort matching the registered monitoring unit; and means for deregistering the registered monitoring unit upon receipt of the associated security code as authorization to allow the person to leave the first facility with the escort without setting the alarm.

14. The system of claim 13, wherein the means for registering the monitoring unit and deregistering the registered monitoring unit are provided at the first facility.

15. The system of claim 13, further comprising means for monitoring a matching monitoring unit associated with the monitoring unit carried on the person, the matching monitoring unit being carried by the escort and including the associated security code.

16. The system of claim 15, further comprising means for registering the matching monitoring unit at the first facility.

17. The system of claim 13, further comprising means for communicating information associated with the registered monitoring unit between the first facility and a central server, and means for registering the monitoring unit at a second facility based on the associated information.

18. The system of claim 13, further comprising means for initializing the monitoring unit, including means for opening a record for the person, means for entering information relating to the person and the predetermined escort, means for entering an identification of the monitoring unit, and means for entering a security code into the record.

19. The system of claim 18, further comprising means for matching the entered information, identification and security code to the person and the predetermined escort registering the monitoring unit.

* * * * *